United States Patent [19]

Albrecht et al.

[11] 3,867,409

[45] Feb. 18, 1975

[54] BIS-BASIC ESTERS OF DIBENZOFURAN

[75] Inventors: William L. Albrecht; Robert W. Fleming, both of Cincinnati, Ohio

[73] Assignee: Richardson-Merrell, Inc., New York, N.Y.

[22] Filed: June 16, 1969

[21] Appl. No.: 833,717

[52] U.S. Cl. ...260/346.2 M, 260/268 TR, 260/247.2 B,
260/293.58, 260/326.25, 424/285, 424/250, 424/267, 424/274, 424/248
[51] Int. Cl.............................................. C07c 5/42
[58] Field of Search .. 260/346.2 M, 294.3, 247.2 B, 260/326.81, 268, 293.58, 326.25, 268 TR

[56]  References Cited
UNITED STATES PATENTS
3,647,860   3/1972   Sill et al........................ 260/268 TR OTHER PUBLICATIONS
Burtner et al., Chem. Abstracts, (1940) Vol. 1940, col. 2841

Primary Examiner—Henry R. Jiles
Assistant Examiner—Bernard I. Dentz
Attorney, Agent, or Firm—George W. Rauchfuss, Jr.; Eugene O. Retter

[57]  ABSTRACT

Novel bis-basic esters and amides of dibenzofuran of the formula

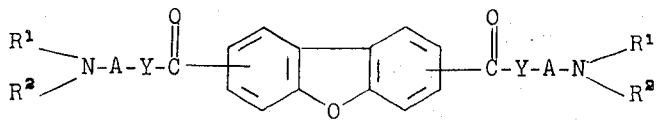

wherein:
A. each of $R^1$ and $R^2$ is hydrogen, (lower)alkyl, cycloalkyl of 3 to 6 ring carbon atoms, alkenyl of 3 to 6 carbon atoms having the vinyl unsaturation in other than the 1-position of the alkenyl group, or each set of $R^1$ and $R^2$ taken together with the nitrogen atom to which they are attached is pyrrolidino, piperidino, N-(lower)alkyl-piperazino, or morpholino;
B. each A is alkylene of 3 to 8 carbon atoms and separates its adjacent Y and aminio nitrogen by an alkylene chain of at least 3 carbon atoms;
C. each Y is oxygen, or N-R wherein R is hydrogen, methyl or ethyl; or a pharmaceutically acceptable acid addition salt thereof. These compounds can be used for preventing or inhibiting viral infections.

5 Claims, No Drawings

BIS-BASIC ESTERS OF DIBENZOFURAN

This invention relates to novel bis-basic esters and amides of dibenzofuran, their method of preparation and use as antiviral agents.

The preparation of dibenzofuran-2,8-dicarboxylic acid and the acid chloride[1], dibenzofuran-3,7-dicarboxylic acid[2], and dibenzofuran-4,6-dicarboxylic acid[3] has been reported in the prior art. Also, bis(2-diethylaminoethyl)-dibenzofuran 2,8-dicarboxylate has been reported in the prior art.[4] However, this latter compound has been found to be substantially void of antiviral activity. To applicants' knowledge, the bis-basic substituted esters or amides of dibenzofuran of this invention are novel compounds.

[1] W. H. Watson, to E. I. DuPont de Nemours and Co., U.S. Patent No. 3,190,853
[2] H. Y. Sugii and H. Shindo, J. Pharm. Soc. Japan, 54, 829 (1934)
[3] H. Gilman and R. V. Young, U.S. Patent No. 2,146,730
[4] R. Burtner and G. Lehmann, J. Am. Chem. Soc. 62, 527–32 (1940)

The compounds of this invention include both the base form and pharmaceutically acceptable acid addition salts of the base form wherein the base form can be represented by the formula

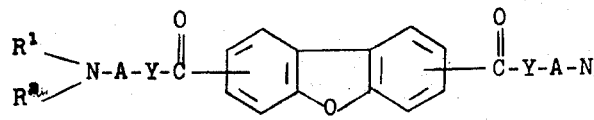

Formula I wherein:

A. each of $R^1$ and $R^2$ is hydrogen, (lower)alkyl, cycloalkyl of 3 to 6 ring carbon atoms, alkenyl of 3 to 6 carbon atoms having the vinyl unsaturation in other than the 1-position of the alkenyl group, or each set of $R^1$ and $R^2$ taken together with the nitrogen atom to which they are attached is pyrrolidino, piperidino, N-(lower)alkylpiperazino, or morpholino;
B. each A is alkylene of 3 to about 8 carbon atoms and separates its adjacent Y and amino nitrogen by an alkylene chain of at least 3 carbon atoms;
C. each Y is oxygen, or N-R wherein R is hydrogen, methyl or ethyl;

As can be seen from the above generic Formula I and the following generic Formulas II and III, one of the side chains

is linked to the dibenzofuran ring system by replacement of one of the hydrogen atoms in positions 1 to 4 of the ring system. The second side chain replaces one of the hydrogen atoms in positions 6 to 9 of the ring system. Illustratively, the dibenzofuran nucleus can be substituted in positions 2,8; 2,6; 3,7; or 4,6. The preferred substitution pattern is 2,8.

Each of the alkylene groups as represented by A in the above generic Formula I is an alkylene group having from 3 to 8 carbon atoms which can be straight chained, or branched chained and which separates its adjacent Y from the amino nitrogen by an alkylene chain of at least three carbon atoms. Thus, the Y group and the amino nitrogen are not on the same carbon atom of the alkylene group. Each of the alkylene groups as represented by A can be the same or different. Preferably both of these groups are the same. Illustrative of alkylene groups as represented by A there can be mentioned: 1,3-propylene; 1,4-butylene; 1,5-pentylene; 1,6-hexylene; 2-methyl-1,4-butylene; 2-ethyl-1,4-butylene; 3-methyl-1,5-pentylene and the like. Preferably, A is alkylene having from 3 to 6 carbon atoms.

Each amino group, i.e.,

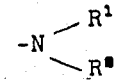

of Formula I, can be a primary, secondary or tertiary amino group. Each of $R^1$ and $R^2$ can be hydrogen, (lower)alkyl, cycloalkyl of 3 to 6 ring carbon atoms, alkenyl of 3 to 6 carbon atoms having the vinyl unsaturation in other than the 1-position of the alkenyl group, or $R^1$ and $R^2$ taken together with the nitrogen atom to which they are attached may form a saturated monocyclic heterocyclic group.

Illustrative of cycloalkyl groups as represented by each of $R^1$ and $R^2$ there can be mentioned: cyclopropyl; cyclobutyl; cyclopentyl; cyclohexyl; and the like. When $R^1$ and $R^2$ represent alkenyl groups, the vinyl unsaturation is in other than the 1-position of said alkenyl group. Illustrative of alkenyl groups as can be represented by each of $R^1$ and $R^2$ there can be mentioned: allyl; 3-butenyl; 4-hexenyl; and the like. Heterocyclic groups represented by $R^1$ and $R^2$ together with the nitrogen atom to which they are attached, include various saturated monocyclic heterocyclic groups such as those generally pharmacologically equivalent to di(-lower)-alkylamino groups, e.g., pyrrolidino, piperidino, morpholino; N-(lower)alkylpiperazino such as N-methylpiperazino; N-ethylpiperazino; and the like. Each of the $R^1$ and $R^2$ groups can be the same or different. Preferably, all of the $R^1$ and $R^2$ groups are the same. The amino groups are preferably tertiary amino groups such as di(lower)alkylamino, dialkenylamino or pyrrolidino, piperidino, N-(lower)alkylpiperazino or morpholino.

Each Y group in Formula I can be oxygen or N—R wherein R is hydrogen, methyl or ethyl. Preferably R is hydrogen.

The term (lower)alkyl or (lower)alkoxy as used herein relates to such groups having from 1 to 6 carbon atoms and preferably from 1 to 4 carbon atoms. Illustrative of (lower)alkyls as can be represented by each of $R^1$ or $R^2$ are methyl; ethyl; n-propyl; isopropyl; n-butyl; secondary butyl; tertiary butyl; isoamyl; n-pentyl; n-hexyl; and the like.

It can be seen from the generic Formula I and its description that the compounds of this invention can be (a) dibenzofuran esters or (b) dibenzofuran amides, which can be illustrated by the following formulas, respectively:

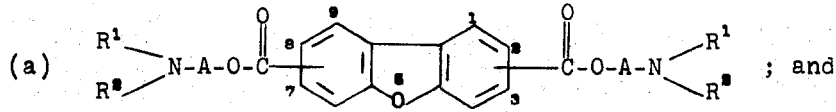

Formula II

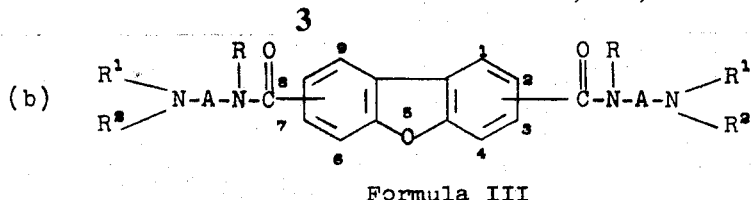

Formula III wherein R, R¹, R² and A have the same meaning as that in the description of Formula I.

Pharmaceutically acceptable acid addition salts of the base compounds of this invention include those of such acids as hydrochloric, hydrobromic, sulfuric, lactic, malonic, maleic, and citric acids. Mono- or di-acid salts can be formed; also, the salts can be hydrated, e.g., monohydrate, or substantially anhydrous.

The compounds and compositions of this invention can be used as antiviral agents for inhibiting or preventing a variety of viral infections by administering such preparations to an infected warm-blooded animal, e.g., a mammal, or to such animal prior to infection. It is believed that the compounds of this invention induce the formation of interferon when host cells are contacted therewith. It is known that interferon inhibits replication of certain viruses. Thus, the compounds of this invention can be used to inhibit development of those viruses which are susceptible to inhibition by interferon.

Illustratively, the compounds can be administered to prevent or inhibit infections of: picornaviruses, e.g., encephalomyocarditis; myxoviruses, e.g., Influenza $A_oPR_s$; arboviruses, e.g., Semliki Forest; and poxviruses, e.g., Vaccinia, IHD. When administered prior to infection, i.e., prophylactically, it is preferred that the administration be within 0 to 96 hours prior to infection of the animal with pathogenic virus. When administered therapeutically to inhibit an infection, it is preferred that the administration be within about a day or two after infection with pathogenic virus.

The daily dosage of the active ingredient can vary over a wide range dependent upon the virus treated, the animal, the extent of infection, the route of administration, etc., such as that of from about 0.1 to 500 mg. (milligrams) per kg. (kilogram) of body weight and preferably from about 0.5 to about 100 mg/kg of body weight. The novel compounds in conventional pharmaceutical forms can be administered orally in unit dosage forms, for example, tablets or capsules, as liquid solutions, suspensions, or elixirs. The quantity of active ingredient in each dosage will generally differ depending on the type of unit dosage, the species of animal and its weight. Thus, each oral dosage can contain from about 1 mg. to 30 gms. of active ingredient in a pharmaceutical carrier.

A preferred mode of administration is by intramuscular or subcutaneous administration in injectable liquid carriers. The parenteral composition can be a solution, suspension or emulsion in conventional parenteral carriers, e.g., sterile liquids such as water, saline, and aqueous dextrose (glucose) and related sugar solutions. In order to minimize or eliminate irritation at the site of injection, the parenteral compositions can contain a non-ionic surfactant such as those having an HLB (hydrophile-lipophile balance) of about 12 to 17. The quantity of surfactant in the formulation can vary from about 5 to 15 percent by weight of the formulation. The following surfactants are illustrative of those which can be used in such formulations: (A) polyoxyethylene derivatives of sorbitan fatty acid esters, such as TWEEN 80, manufactured by Atlas Powder Company. (B) High molecular weight adducts of ethylene oxide with a hydrophobic base formed by the condensation of propylene oxide with propylene glycol, e.g., PLURONIC F-68, manufactured by Wyandotte Chemical Company. A preferred surfactant is Polysorbate 80, U.S.P., a polyoxyethylene sorbitan monooleate. The quantity of a compound of this invention, either in the base form or a pharmaceutically acceptable acid addition salt in such formulations, can vary over a broad range such as that mentioned hereinbefore, i.e., 0.05 to 20% by weight of the formulation. Preferably, the active ingredient is in the base form.

The compounds of this invention can be prepared by a variety of procedures including the following:

1. 
   A. The reaction of a dibenzofuran dicarboxylic acid or a reactive derivative thereof such as an acid halide or ester of the formula

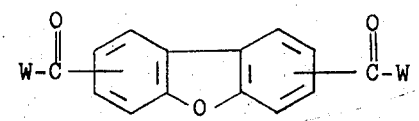

wherein W is hydroxy, halogen such as chlorine or bromine, or a lower alkoxy such as methoxy or ethoxy, with at least two equivalents of an aminoalkanol or aminoalkylamine of the formula

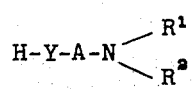

wherein Y is oxygen or N-R wherein R is hydrogen, methyl or ethyl, A is alkylene of 3 to about 8 carbon atoms, either straight chain or branched and separates Y and the amino nitrogen by an alkylene chain of at least 3 carbon atoms, and each R¹ and R² is as previously defined.

B. The esterification can be achieved by allowing the dibenzofuran dicarboxylic acid, where W in the above formula is hydroxy, to react with at least two equivalents of the appropriate aminoalkanol in an inert solvent in the presence of a catalyst and employing general methods for removing water from the reaction site. Preferred solvents are chloroform, isopropanol, dioxane, toluene and the like. The reaction may be catalyzed by the use of mineral acids including hydrochloric, sulfuric or certain organic acids such as p-toluenesulfonic acid. Methods whereby water can be removed from the reaction include the use of water scavengers such as the carbodiimides or by the azeotropic removal of water. The reaction will proceed at temperatures ranging from 50°–150°C. over a period of 6 to 72 hours depending upon the solvent and catalyst.

C. Preferably, the esterification can be achieved by allowing the acid halide, where W in the above formula is halogen, to react with at least two equivalents of the appropriate aminoalkanol. The esters of this invention can be produced in a variety of inert solvents over a wide range of temperature and reaction time. The solvents of choice include chloroform, dioxane, tetrahydrofuran, and the aromatic solvents such as benzene and toluene. In chloroform, the reaction is generally complete within one hour at the reflux temperature of the solvent, although the reaction time can range from 15 minutes to 3 days. In like manner, the amides of this invention can be prepared by allowing the dibenzofuran di-acid halide to react with at least two equivalents of the appropriate aminoalkylamine. The preferred reaction conditions are those which employ chloroform as the solvent and heating at the reflux temperature of said solvent for 3–18 hours.

D. The compounds of this invention may also be produced by transesterification reaction in which a (lower)-alkoxy ester of the dibenzofuran dicarboxylic acid, where W, for example, is methoxy or ethoxy in the above formula, is caused to react with at least two equivalents of the appropriate aminoalkanol under suitable conditions. This type of reaction is catalyzed by suitable alkaline catalysts such as alkali metals, sodium or potassium; alkali lower alkoxides, such as sodium methoxide or sodium ethoxide; alkali amides such as lithium or sodium amide; etc. In carrying out the reaction, the equilibrium is shifted by removing the lower alkanol component or by employing a large excess of the aminoalkanol. The lower alkanol may be removed by direct distillation or distillation with a suitable solvent. Suitable solvents are those forming an azeotropic distillation mixture with the lower alkanol, for example, benzene or toluene, or a solvent which boils sufficiently higher than the alkanol to permit removal of the alkanol by distillation at a temperature below that of the boiling range of the solvent.

E. The amides of this invention may also be produced by allowing the lower alkoxy ester of the dibenzofuran dicarboxylic acid to react with at least two equivalents of the appropriate aminoalkylamine under the conditions as for the esters.

2. The esters of this invention can be produced by allowing the dibenzofuran dicarboxylic acid, or an activated salt thereof, to react with at least two equivalents of an aminoalkylhalide in a suitable organic solvent such as chloroform or isopropanol. The aminoalkyl portion of the reactant is the same as in 1-A above. The reaction conditions can vary from 6 hours to 72 hours over a temperature range of from room temperature to the reflux temperature of the solvent employed in the presence or absence of an activating moiety such as inorganic cations including sodium and silver or organic activators such as benzyltrimethylammonium chloride. These activators may be present in stoichiometric amounts or catalytic quantities. Since these activators considerably reduce the reaction time, the preferred conditions are to use a catalytic amount of benzyltrimethylammonium chloride and allow the reaction to proceed for 6–18 hours at the reflux temperature of isopropanol.

3. The compounds of this invention can also be prepared by allowing a dibenzofuran ω-haloalkyl diester or diamide, prepared by general methods, of the formula:

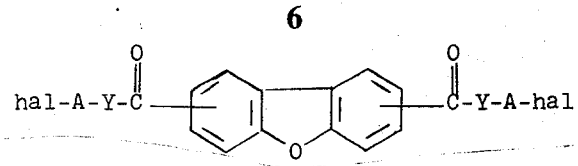

wherein Y and A are as previously defined and hal is chlorine, bromine or iodine to react with at least two equivalents of an amine of the formula:

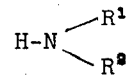

wherein $R^1$ and $R^2$ are as previously defined. The dibenzofuran ω-haloalkyl diester or diamide may be prepared by the reaction of a dibenzofuran dicarbonyl chloride with at least two equivalents of an ω-haloalkanol or an ω-haloalkylamine in a suitable solvent such as chloroform to give the respective products. The preferred halogen in the above formula is bromine or iodine.

The reaction is conducted in the presence of stoichiometric amounts of a material which will effectively remove the acid generated in the course of the reaction. Suitable acid binding reagents are anhydrous sodium or potassium carbonate or extra equivalents of the amine. The solvents of choice are non-protonic organic liquids such as toluene, chloroform, diethyl ether and dioxane. Suitable conditions are those in which components are allowed to react in toluene at 25° to 100°C. for 24 hours to 72 hours in the presence of potassium carbonate. A pressure vessel may be required as higher temperatures are employed and/or low boiling amines are being reacted.

4. The secondary or primary amino derivatives of the esters of this invention can be prepared by the various procedures under 1 above, if the amino group of the aminoalkanol is suitably blocked to reactivity by formation of a salt or, preferably, by substituting it with a readily removable blocking group such as trifluoroacetyl, carbobenzoxy or the like, followed by removal of the blocking group with a suitable technique such as mild acid hydrolysis or catalytic reduction.

The following examples are illustrative of the invention.

EXAMPLE 1

Preparation of Bis(3-Diethylaminopropyl) Dibenzofuran-2,8-Dicarboxylate Dihydrochloride To 2 l. of chloroform was added 14.5 g. (0.05 mole) of dibenzofuran-2,8-dicarbonyl chloride and 13 g. (0.1 mole) of 3-diethylaminopropanol and the solution was heated at reflux for 12 hours. The reaction mixture was concentrated to about 500 ml. and the product was crystallized from chloroform-petroleum ether (75°–90°). A second crystallization from isopropanol gave the product, m.p. 258°–259.5°, $\lambda_{max}^{EtOH}$ 242, $E_{1cm}^{1\%}$ 1320.

EXAMPLE 2

Preparation of Bis(3-Dibutylaminopropyl) Dibenzofuran-2,8 Dicarboxylate Dihydrochloride Hemihydrate A solution of 20 g. (0.068 mole) of dibenzofuran2,8-dicarbonyl chloride and 26.6 g. (0.14 mole) of 3-dibutylaminopropanol in 750 ml. of chloroform was heated at reflux for 6 hours. The solution was allowed to cool, diluted with ether and the product which sepa-

EXAMPLE 3

Preparation of Bis(3-Dimethylaminopropyl) Dibenzofuran-2,8Dicarboxylate Dihydrochloride Hemihydrate A solution of 8.8 g. (0.03 mole) of dibenzofuran2,8-dicarbonyl chloride and 6.2 g. (0.06 mole) of 3-dimethylaminopropanol in 400 ml. of chloroform was refluxed for 16 hours. On cooling, the product crystallized and after two recrystallizations from methanol-butanone, gave the product, m.p. 222.5-224°, $\lambda_{max}^{H_2O}$ 243, $E_{1cm}^{1\%}$ 1330.

EXAMPLE 4

Preparation of Bis(3-diallylaminopropyl) Dibenzofuran-2,8-Dicarboxylate Dihydrochloride When 3-diallylaminopropanol, 9.3 g. (0.06 mole) was used in place of 3-dimethylaminopropanol and the procedure of Example 3 was followed, except that petroleum ether was added to the reaction mixture to precipitate the product, the diallylaminopropyl ester was obtained, m.p. 223°–225°, $\lambda_{max}^{H_2O}$ 244, $E_{1cm}^{1\%}$ 1170.

EXAMPLE 5

Preparation of Bis(3-Dipropylaminopropyl) Dibenzofuran-2,8-Dicarboxylate Dihydrochloride Hemihydrate The procedure of Example 4 is followed in which diallylaminopropanol is replaced by 9.6 g. (0.06 mole) of dipropylaminopropanol to yield the product, m.p. 222°–224°, $\mu_{max}^{H_2O}$ 243, $E_{1cm}^{1\%}$ 1120.

EXAMPLE 6

Preparation of Bis(3-Diisopentylaminopropyl) Dibenzofuran-2,8-Dicarboxylate

When 3-diisopentylaminopropanol, 18.9 g. (0.06 mole) was used in place of 3-dimethylaminopropanol and the procedure of Example 3 was followed, the diisopentylaminopropyl ester as the dihydrochloride salt was obtained, m.p. 171°–173°. The salt was converted to the free base which was an opaque viscous oil, $\lambda_{max}^{0.1\ N\ HCl}$ 244, $E_{1cm}^{1\%}$ 1080.

EXAMPLE 7

Preparation of Bis(3-Piperidinopropyl) Dibenzofuran-2,8-Dicarboxylate Dihydrochloride Monohydrate A solution of 12.8 g. (0.044 mole) of dibenzofuran-2,8-dicarbonyl chloride and 12.6 g. (0.088 mole) of 3-piperidinopropanol in 1 l. of chloroform was refluxed for 4 hours. Upon dilution with diethyl ether, the product was collected and crystallized from ethanol, m.p. 252°–253°, $\lambda_{max}^{EtOH}$ 243, $E_{1cm}^{1\%}$ 1240.

EXAMPLE 8

Preparation of N,N'-Bis(3-Dibutylaminopropyl) Dibenzofuran-2,8-Dicarboxamide Bis-Dihydrogen Citrate A solution of 8.8 g. (0.03 mole) of dibenzofuran-2,8-dicarbonyl chloride and 11.2 g. (0.06 mole) of 3-dibutylaminopropylamine in 400 ml. of chloroform was heated at reflux for 4 hours. The chloroform solution was extracted with water, and the aqueous layer made basic with saturated sodium bicarbonate solution. The free base was extracted with diethyl ether, washed with water, dried over anhydrous magnesium sulfate and concentrated in vacuo. The residue was dissolved in methanol and converted to the dihydrogen citrate salt by treating the methanol solution with two equivalents of citric acid. The product was crystallized twice from methanol-butanone, m.p. 56–59°, $\lambda_{max}^{H_2O}$ 241, $E_{1cm}^{1\%}$ 626.

EXAMPLE 9

Preparation of N,N'-Bis(3-Diethylaminopropyl) Dibenzofuran-2,8-Dicarboxamide Bis-Dihydrogen Citrate By the procedure of Example 8, one equivalent of dibenzofuran-2,8-dicarbonyl chloride is allowed to react with two equivalents of 3-diethylaminopropylamine to give the product.

EXAMPLE 10

Preparation of Bis(3-Diethylaminopropyl) Dibenzofuran-3,7-Dicarboxylate

Bis(3-diethylaminopropyl) dibenzofuran-3,7-dicarboxylate can be prepared by the reaction of dibenzofuran3,7-dicarbonyl chloride and 3-diethylaminopropanol, according to the procedure of Example 1.

EXAMPLE 11

Preparation of Bis(3-Diethylaminopropyl) Dibenzofuran-4,6-Dicarboxylate

Bis(3-diethylaminopropyl) dibenzofuran-4,6-dicarboxylate can be prepared by the reaction of dibenzofuran-4,6-dicarbonyl chloride with 3-diethylaminopropanol, acccording to the procedure of Example 1.

EXAMPLE 12

This example illustrates antiviral activity of bis(3-dipropylaminopropyl) dibenzofuran-2,8-dicarboxylate dihydrochloride hemihydrate.

Two groups of mice were inoculated with a fatal dose (10 $LD_{50}$) of encephalomyocarditis. Each mouse weighed about 15 grams and each of the two groups of mice contained from 10 to 30 animals. The mice in one of the groups were treated both prophylactically and therapeutically by subcutaneous injections of bis(3-dipropylaminopropyl) dibenzofuran-2,8-dicarboxylate dihydrochloride hemihydrate. The injections were given 28, 22 and 2 hours prior to inoculation with the virus and 2, 20 and 26 hours after inoculation. The volume of each injection was 0.25 ml. and contained the active ingredient at a dosage level of 250 mg. per kg. of body weight dissolved in sterile water which also contained 0.15% of hydroxyethylcellulose. The control animals received a sham dosage of the same volume of the vehicle which did not contain the active ingredient. Observations over a 10-day period showed that the treated group of mice survived for a longer time than the controls.

EXAMPLE 13

An illustrative composition for a parenteral injection is the following aqueous emulsion.

| Each ml. (milliliter) contains | Ingredient | Amount |
|---|---|---|
| 10 mg. | Bis(3-dibutylaminopropyl) dibenzofuran-2,8-dicarboxylate dihydrochloride hemihydrate | 0.20 g. |
| 100 mg. | Polysorbate 80 | 2.000 g. |
| 0.0064 mg. | Sodium chloride | 0.128 g. |
|  | Water for injection, q.s. | 20.000 ml. |

The composition of Example 13 is prepared by: dissolving 0.64 grams of sodium chloride in 100 ml. of water for injection; mixing the Polysorbate 80 with the active ingredient; adding a sufficient solution of the sodium chloride in water to the active ingredient and Polysorbate to make 20 ml.; shaking the mixture; and then autoclaving it for 20 minutes at 110°C. at 15 p.s.i.g. steam pressure. The composition can be dispensed in a single ampule for multiple dosage or in 10 or 20 ampules for single dosages.

What is claimed is:

1. A compound of the formula

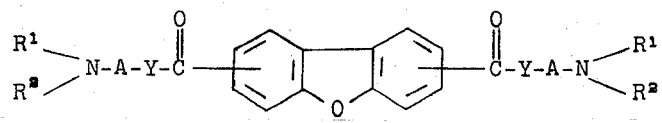

wherein
A. each of $R^1$ and $R^2$ is hydrogen, (lower)alkyl, cycloalkyl of 3 to 6 ring carbon atoms, alkenyl of 3 to 6 carbon atoms having the vinyl unsaturation in other than the 1-position of the alkenyl group, or each set of $R^1$ and $R^2$ taken together with the nitrogen atom to which they are attached is pyrrolidino, piperidino, N-(lower)alkylpiperazino, or morpholino;
B. each A is alkylene of 3 to 8 carbon atoms and separates its adjacent Y and amino nitrogen by an alkylene chain of at least 3 carbon atoms;
C. each Y is oxygen, or a pharmaceutically acceptable acid addition salt thereof.

2. A compound of claim 1 wherein: each A is alkylene of 3 to 6 carbon atoms; and each of the $$-N\begin{matrix}R^1\\R^2\end{matrix}$$

groups is a tertiary amino group selected from di(lower)-alkylamino, dialkenylamino or each set of $R^1$ and $R^2$ together with the nitrogen to which they are attached is pyrrolidino, piperidino, N-(lower)alkylpiperazino or morpholino.

3. A compound of the formula

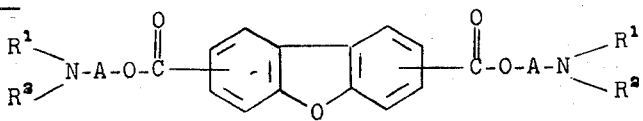

wherein:
A. each of $R^1$ and $R^2$ is hydrogen, (lower)alkyl, cycloalkyl of 3 to 6 ring carbon atoms, alkenyl of 3 to 6 carbon atoms having the vinyl unsaturation in other than the 1-position of the alkenyl group, or each set of $R^1$ and $R^2$ taken together with the nitrogen atom to which they are attached is pyrrolidino, piperidino, N-(lower)alkylpiperazino, or morpholino;
B. each A is alkylene of 3 to 8 carbon atoms and separates its adjacent oxygen and amino nitrogen by an alkylene chain of at least 3 carbon atoms; and
C. the ester side chains are in the 2,8- or 3,7- or 4,6-positions of the dibenzofuran nucleus; or a pharmaceutically acceptable acid addition salt thereof.

4. A compound of claim 4 wherein each A is alkylene of 3 to 6 carbon atoms; each of the

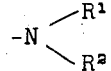

groups is a tertiary amino group selected from di(lower)alkylamino, dialkenylamino or each set of $R^1$ or $R^2$ together with the nitrogen to which they are attached is pyrrolidino, piperidino, N-(lower)alkylpiperazino or morpholino; and the ester side chains are in the 2,8-positions.

5. A compound of claim 5 wherein each of $R^1$ and $R^2$ is (lower)alkyl of 1 to 4 carbon atoms.

* * * * *

UNITED STATES PATENT OFFICE
CERTIFICATE OF CORRECTION

PATENT NO. : 3,867,409
DATED : February 18, 1975
INVENTOR(S) : William L. Albrecht and Robert W. Fleming It is certified that error appears in the above-identified patent and that said Letters Patent are hereby corrected as shown below:

Column 7, Example 3, line 14, "$\lambda$ max H O" should read "$\lambda$ max $H_2O$"; Example 4, line 26, "$\lambda$ max H O" should read "$\lambda$ max $H_2O$"; Example 5, line 35, "$\mu$ max H O" should read "$\lambda$ max $H_2O$". Column 8, Example 8, line 8 "H O" should read "$H_2O$". Column 9, Example 13, line 9, "011 0.128 g" should read "0.128 g"; line 50, "and each of the           " should read "and each of the $-N\begin{matrix}R^1\\R^2\end{matrix}$ ". Column 10, line 37, "4. A compound of claim 4" should read "4. A compound of claim 3"; line 48, "5. A compound of claim 5" should read "5. A compound of claim 4".

Signed and sealed this 24th day of June 1975.

(SEAL)
Attest:

RUTH C. MASON
Attesting Officer

C. MARSHALL DANN
Commissioner of Patents
and Trademarks